(12) United States Patent
Wakabayashi

(10) Patent No.: US 7,480,714 B2
(45) Date of Patent: Jan. 20, 2009

(54) MONITORING APPARATUS AND MONITORING/NOTIFYING METHOD FOR RECEIVER AND SENDER TERMINALS AND FOR E-MAIL TRANSMISSION SYSTEM OF RECEIVER TERMINAL

(75) Inventor: Takefumi Wakabayashi, Saitama (JP)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 09/995,696

(22) Filed: Nov. 29, 2001

(65) Prior Publication Data
US 2002/0120699 A1    Aug. 29, 2002

(30) Foreign Application Priority Data
Feb. 27, 2001    (JP) ............................. 2001-051671

(51) Int. Cl.
*G06F 15/173* (2006.01)
*G06F 15/16* (2006.01)

(52) U.S. Cl. .................. 709/224; 709/206; 709/217; 709/219

(58) Field of Classification Search ............... 709/203, 709/208, 209, 218, 224, 227, 228, 229, 205, 709/223, 217, 219
See application file for complete search history.

(56) References Cited

U.S. PATENT DOCUMENTS

| | | | | |
|---|---|---|---|---|
| 5,706,411 | A * | 1/1998 | McCormick et al. | 358/1.14 |
| 5,727,135 | A * | 3/1998 | Webb et al. | 358/1.14 |
| 5,881,233 | A | 3/1999 | Toyoda et al. | |
| 5,887,216 | A * | 3/1999 | Motoyama | 399/8 |
| 5,909,493 | A * | 6/1999 | Motoyama | 713/154 |
| 6,088,125 | A | 7/2000 | Okada et al. | |
| 6,094,277 | A | 7/2000 | Toyoda | |
| 6,124,939 | A | 9/2000 | Toyoda et al. | |
| 6,173,320 | B1 * | 1/2001 | Cunningham | 709/220 |
| 6,229,884 | B1 | 5/2001 | Toyoda et al. | |
| 6,259,538 | B1 * | 7/2001 | Amit et al. | 358/442 |
| 6,301,611 | B1 * | 10/2001 | Matsumoto et al. | 709/217 |

(Continued)

FOREIGN PATENT DOCUMENTS

JP    2-172348    7/1990

(Continued)

OTHER PUBLICATIONS

English Language Abstract of JP 2000-222333.

(Continued)

*Primary Examiner*—Ario Etienne
*Assistant Examiner*—Sargon N Nano
(74) *Attorney, Agent, or Firm*—Greenblum & Bernstein, P.L.C.

(57) ABSTRACT

A monitoring apparatus and monitoring/notifying method for receiver and sender terminals of an e-mail transmission system having a receiver terminal can confirm a status of a receiver terminal, prior to a transmission. A monitoring server monitors status of receiver terminals, such as IFAX and PC units, which are connected to the same LAN. The IFAX and PC units notify the monitoring server of the current status information according to requests made by the monitoring server. The monitoring server notifies IFAX units of the sending side, if an abnormal condition of the IFAX of the receiving side is detected. Upon receiving the notification from the monitoring server via the internet, the IFAX units of the sending side inform senders of the abnormal condition, by illuminating an LED.

13 Claims, 18 Drawing Sheets

U.S. PATENT DOCUMENTS

| | | | |
|---|---|---|---|
| 6,308,205 B1 * | 10/2001 | Carcerano et al. | 709/221 |
| 6,314,476 B1 * | 11/2001 | Ohara | 710/15 |
| 6,389,544 B1 * | 5/2002 | Katagiri | 713/300 |
| 6,424,425 B1 * | 7/2002 | Otsuka | 358/1.15 |
| 6,437,873 B1 * | 8/2002 | Maeda | 358/1.15 |
| 6,522,421 B2 * | 2/2003 | Chapman et al. | 358/1.15 |
| 6,581,092 B1 * | 6/2003 | Motoyama et al. | 709/219 |
| 6,631,407 B1 * | 10/2003 | Mukaiyama et al. | 709/223 |
| 6,714,971 B2 * | 3/2004 | Motoyama et al. | 709/219 |
| 6,748,183 B2 * | 6/2004 | Edmonds | 399/23 |
| 6,757,714 B1 * | 6/2004 | Hansen | 709/206 |
| 6,785,015 B1 * | 8/2004 | Smith et al. | 358/1.15 |
| 6,961,137 B1 * | 11/2005 | Tamura | 358/1.15 |
| 7,012,708 B2 * | 3/2006 | Tamaru | 358/1.15 |
| 7,069,480 B1 * | 6/2006 | Lovy et al. | 714/57 |
| 7,245,391 B2 * | 7/2007 | Nishimura | 358/1.15 |
| 2002/0051168 A1 * | 5/2002 | Yashiki | 358/1.15 |
| 2003/0011805 A1 * | 1/2003 | Yacoub | 358/1.15 |
| 2005/0021608 A1 * | 1/2005 | Wolff | 709/203 |

FOREIGN PATENT DOCUMENTS

| | | |
|---|---|---|
| JP | 6-276313 | 9/1994 |
| JP | 8242326 | 9/1996 |
| JP | 10-269039 | 10/1998 |
| JP | 11-008727 | 1/1999 |
| JP | 11-234454 | 8/1999 |
| JP | 2000-222333 | 8/2000 |
| JP | 2000-311095 | 11/2000 |
| JP | 2001-056789 | 2/2001 |
| JP | 2002-111946 | 4/2002 |

OTHER PUBLICATIONS

English Language Abstract of JP 10-269039.
English Language Abstract of JP 11-008727.
English Language Abstract of JP 2002-111946.
English Language Abstract of JP 2001-056789.
English Language Abstract of JP 2000-311095.
English Language Abstract of JP 2-172348.
English Language Abstract of JP 6-276313.
English Language Abstract of JP 11-234454.

* cited by examiner

Fig. 3

Monitored Terminal Information Table

| Name | IP Address 32 | Mail Address 33 | Notifying Mail Address 34 | Notification Status 35 |
|---|---|---|---|---|
| PC1 | 172.21.22.1 | | | 0 |
| PC2 | 172.21.22.2 | | | 0 |
| IFAX1 | 172.21.22.3 | IFAX1@mei.com | Test@mgcs.co.jp | 1,2,3 |

| Job No. | Transmission Destination | Job Status |
|---------|--------------------------|------------|
| 001 | Test@mgcs.co.jp | Waiting for Delivery Confirmation |
| 002 | Test1@mgcs.co.jp | Reserving a Transmission Job |
| | .. | .. |

Transmission Job Maneging Table

Fig. 7

| Register No. | Destination Address | Status Information |
|---|---|---|
| 001 | Test@mgcs.co.jp | 0 |
| 002 | Test2@mgcs.co.jp | 0 |
| 999 | Test99@mgcs.com | 2 |

One-touch Speed Dial Number Registration Table

Registration Protocol

Fig. 18

Warning Report

1801

Warning Report

Job No.:001
Transimission Date:9/14/2000 14:32
Destination:One-touch 01:ifax @ mei.com Status
kanshi @ mei.com Notified that ifax @ mei.com had an abnormal condition,prior to receiving the delivery confirmation mail.
The transmitted document may not have reached the distination.

MONITORING APPARATUS AND MONITORING/NOTIFYING METHOD FOR RECEIVER AND SENDER TERMINALS AND FOR E-MAIL TRANSMISSION SYSTEM OF RECEIVER TERMINAL

BACKGROUND OF THE INVENTION

1. Field of the Invention

This invention relates to a monitoring apparatus, a receiver, a sender and monitoring/notifying method for e-mail transmission system of receiver terminal.

2. Description of Related Art

In the recent years, internet facsimile terminal apparatuses for e-mail (IFAX) that receive/transmit data by using e-mail on the internet have become available, and they are disclosed in publications such as Japanese Laid Open Patent Application H08-242326 and its corresponding U.S. patent application Ser. No. 5,881,233.

Such IFAXes are different from normal facsimile machines that use telephone lines and do not negotiate with receiver terminals; therefore, they cannot confirm whether image information is actually delivered to receiver terminals. Conventionally, as a solution to the problem, delivery confirmation mail messages that notify reception status to sender IFAX from the receiver terminal have been proposed (RFC2532).

The conventional art has made it possible to confirm reception status from delivery confirmation mail messages, however, such delivery confirmation mail messages are made and transmitted by a receiver terminal, thus cannot be received when the power is off at the receiver terminal. The same is true when the receiver terminal is frozen for some reason.

When such a delivery confirmation mail message is not received, the sender IFAX must determine that the transmission has failed, only after a delivery time-out by the mail server. Also, when the receiver terminal is turned off, it is very likely that transmitted e-mail messages will not be read immediately, therefore, the sender may choose other means of communication (e.g., G3FAX) to transmit the message. However, e-mail apparatuses including recent IFAXes do not have the capacity to detect the condition (status) whether the power is turned off at receiver terminals, before transmitting messages.

SUMMARY OF THE INVENTION

This invention is provided in view of the above-described problems. The object of the present invention is to provide a monitoring apparatus, a receiver, a sender and monitoring/notifying method for e-mail transmission system of receiver terminal that can confirm status of a receiver terminal, prior to transmission.

To solve the above-described problem, a monitoring apparatus is provided to monitor status of a receiver terminal (monitored terminal) to notify a sender terminal (notified terminal) of changes in status of the receiver terminal, and to notify the sender with the notification information at the sender terminal. Accordingly, the sender is notified of current status of the receiver terminal, when transmitting or before transmitting a message.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 shows a monitored terminal information table that is maintained by the monitoring server according to the embodiment of the present invention;

FIG. 6 shows a transmission job managing table that is maintained by the sender terminal according to the embodiment of the present invention;

FIG. 7 shows a one-touch button/speed dial number registration table that is maintained by the sender terminal according to the embodiment of the present invention;

FIG. 18 shows an example of a warning report that is output by the sender terminal according to the embodiment of the present invention.

DETAILED DESCRIPTION OF PREFERRED EMBODIMENTS

Figure 1:
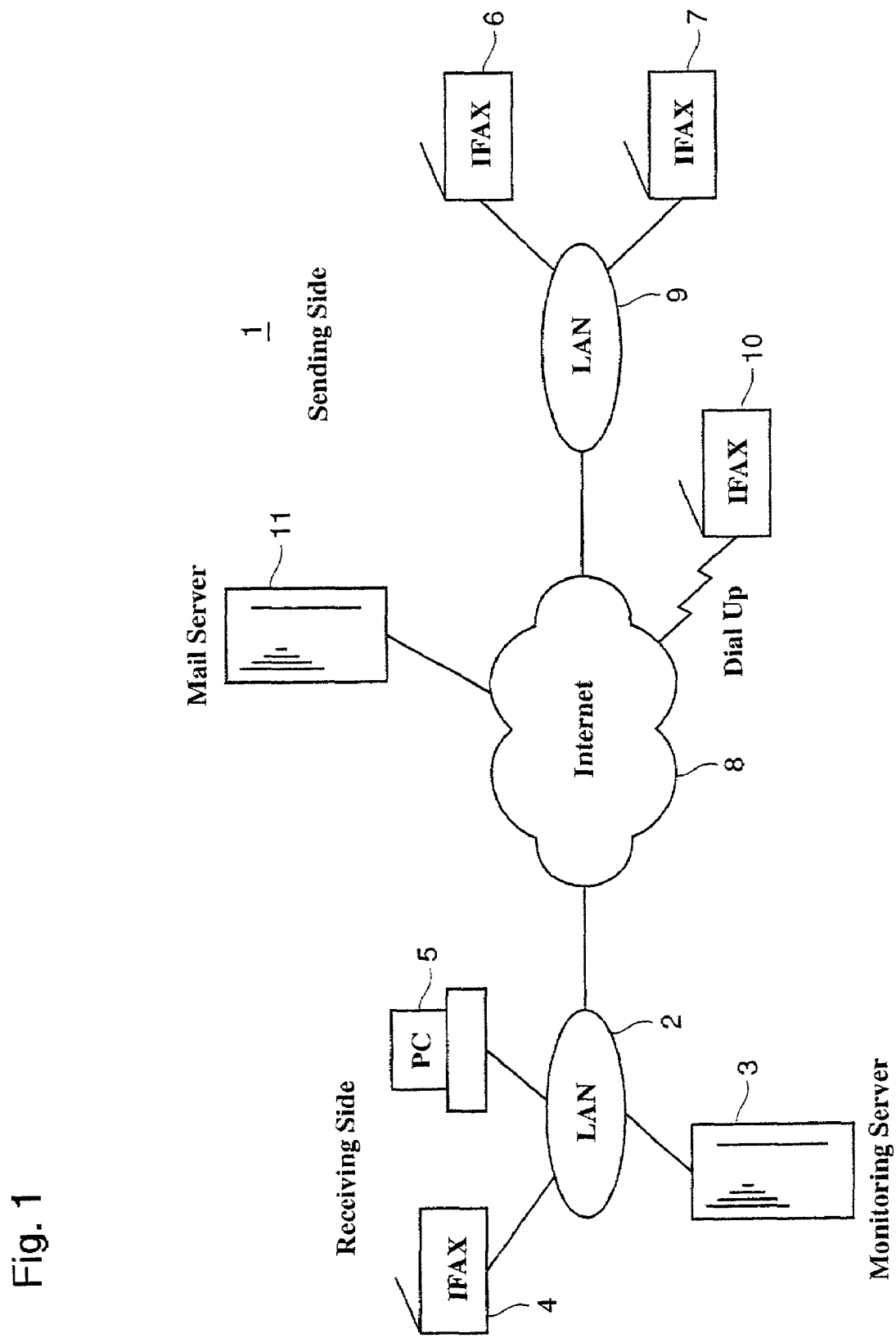
FIG. 1 is a conceptual rendering illustrating a computer network system in which a monitoring server, receiver and sender terminals operate, according to an embodiment of the present invention.

The embodiment of the present invention is further explained in the following, in reference to the above-described drawings. FIG. 1 is a conceptual rendering illustrating a computer network system in which a monitoring server, receiver and sender terminals operate, according to an embodiment of the present invention.

In a system 1, a monitoring server 3 is connected to a LAN 2 of the receiving side. The monitoring server 3 monitors, in real time, status of receiver terminal such as an IFAX 4 and a PC 5, that are connected to the same LAN 2. The IFAX 4 and PC 5 notify the monitoring server 3 in real time, of current status information in response to the request from the monitoring server 3. Further, the IFAX 4 and PC 5 register sender terminals' addresses to report their status, and status to be notified (notified information) in the monitoring server 3. According to the registered information, the monitoring server 3 performs notification processes.

Sender terminals, such IFAX units 6 and 7 (notified terminals), receive the status notification of the receiver terminals from the monitoring server 3, via the internet 8. Upon receiving the notification, the sender terminals notify senders by displaying the information, illuminating LED, printing a warning report to report the information, etc.

IFAX units 6, 7, and 10 have an e-mail system that transmits image information being attached to e-mail to the IFAX 4 and PC 5 of the receiving side, via a mail server 11 on the internet 8, for example.

IFAX units 6 and 7 are connected to the internet 8 via a LAN 9, and the IFAX 10 is connected to the internet 8 via a dial-up connection.

Figure 2:
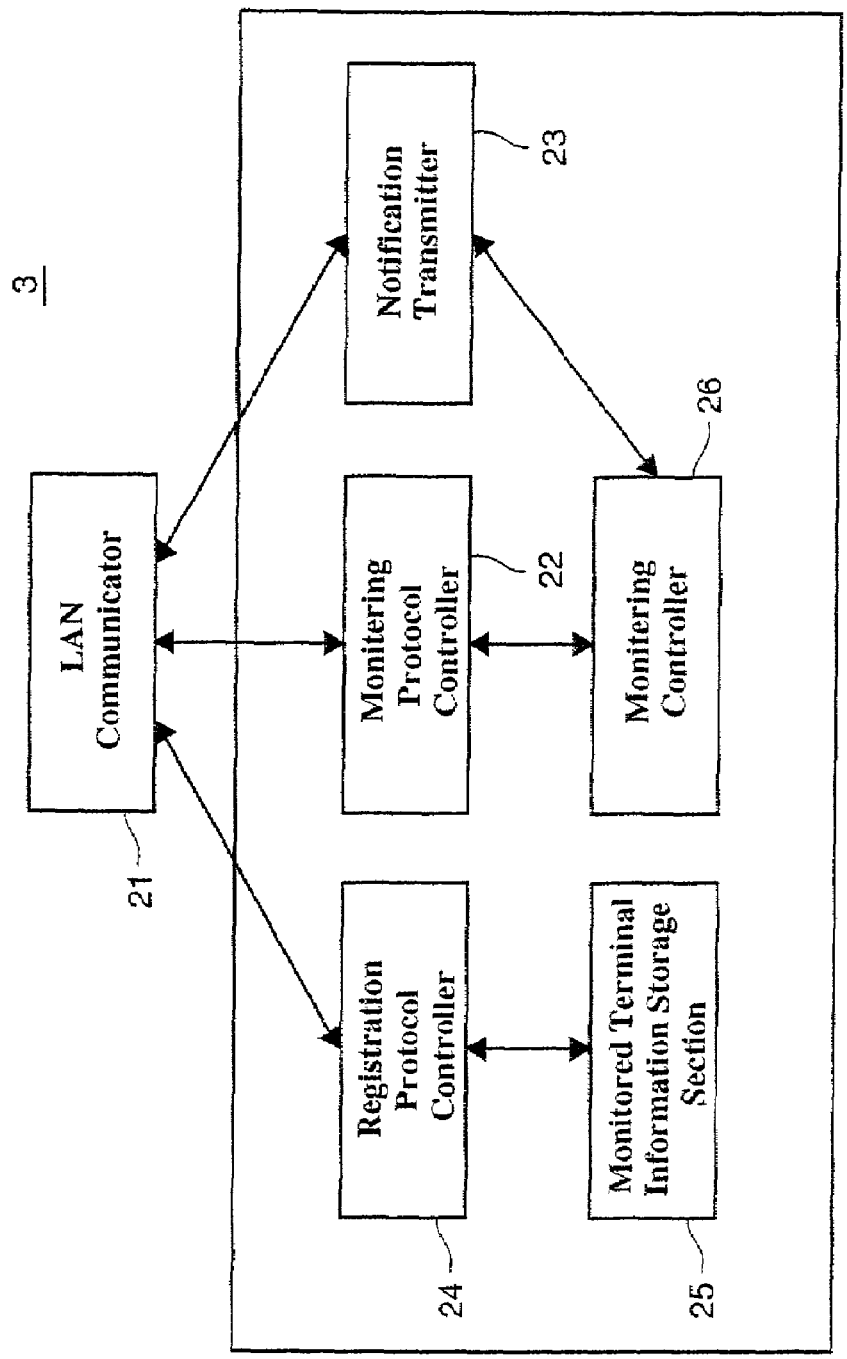
FIG. 2 is a block diagram illustrating functions of the monitoring server according to the embodiment of the present invention.

FIG. 2 is a block diagram illustrating functions of the monitoring server according to the embodiment of the present invention. The monitoring server 3 is provided with a LAN communicator 21 that performs communication on the LANs 2 and 9, and the internet 8 via a LAN interface (not shown). Also, the monitoring server 3 is provided with a monitoring protocol controller 22 that controls monitoring protocol executed with the receiver terminals (monitored terminals). A notification transmitter 23 performs notification to the sender terminals. The notification transmitter 23 generates an e-mail message of the receiver terminal's status in a predetermined format (status notification mail), and transmits the message to the sender terminal with an e-mail forwarding protocol.

A registration protocol controller 24 executes a registration protocol with the receiver terminal. A monitored terminal information storage section 25 maintains a monitored terminal information table, shown in FIG. 3, which registers monitored terminal information obtained from receiver terminals with the registration protocol. FIG. 3 shows a monitored terminal information table that is maintained by the monitoring server according to the embodiment of the present invention. In the monitored terminal information table 30, names 31, IP addresses 32, mail addresses 33, notifying mail addresses 34, and notification-needed status 35 are registered for each monitored terminal. The name 31 is a monitored terminal name given by a user, the IP address 32 is an IP address of the monitored terminal, the mail address 33 is a mail address in case the monitored terminal is an e-mail receiving terminal such as an IFAX, and the notification mail address 34 is a mail address of the receiver terminal (notified terminal) to be notified in case of a notification-needed status. This notifying mail address 34 is created from destination information maintained by the receiver terminal (described later), and a multiple of destinations can be registered as the notification mail addresses 34. The notification-needed status 35 is a status with which the monitored terminal is required to notify: 0 for no need to notify; 1 for power turned off from being on; 2 for the power turned on from being off; and 3 for printer cannot be used.

A monitoring controller 26 recognizes the receiver terminal's status obtained from the receiver terminal by the monitoring protocol, and when there is a change in the status, requests the notification transmitter 23 to notify the sender terminal according to the monitored terminal information table 30.

Figure 4:
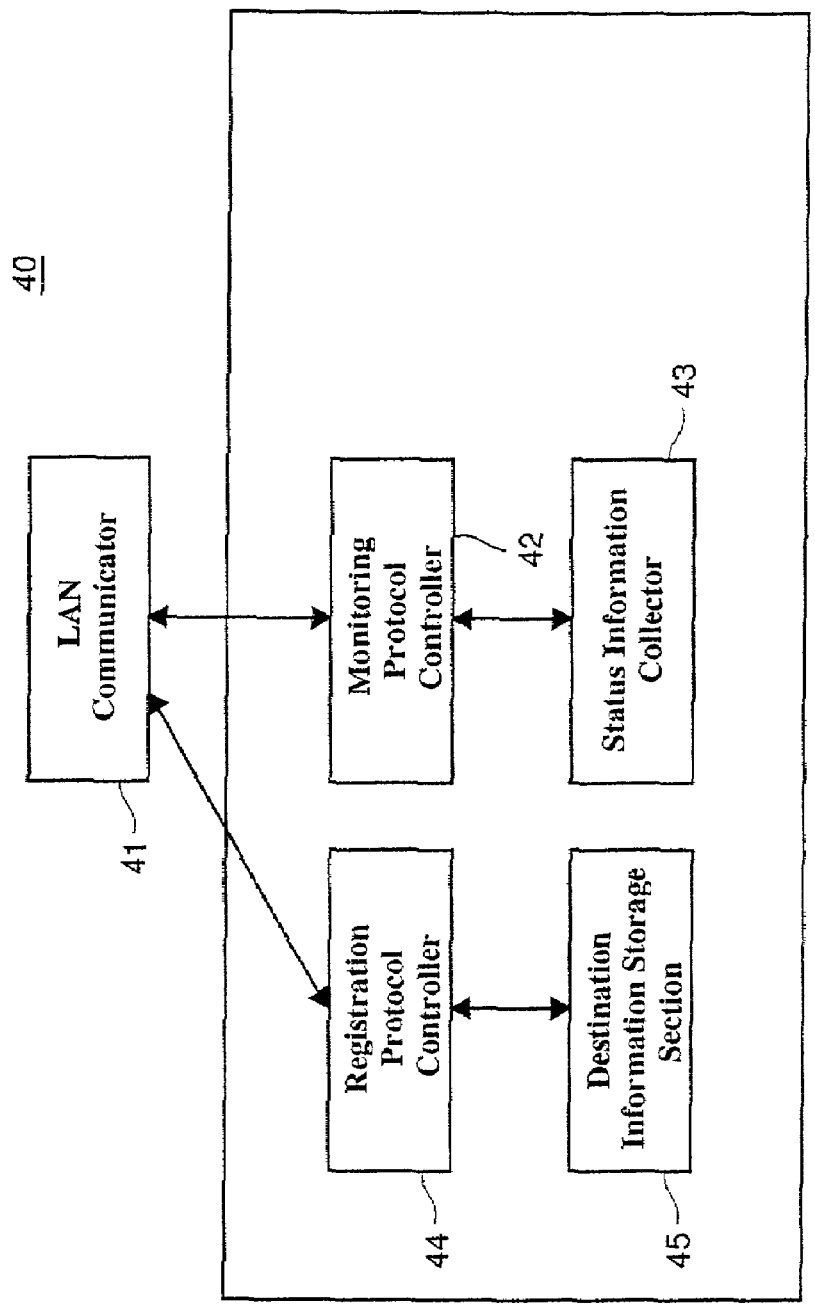
FIG. 4 is a block diagram illustrating functions of the receiver terminal according to the embodiment of the present invention.

FIG. 4 is a block diagram illustrating functions of the receiver terminal according to the embodiment of the present invention. A receiver terminal (monitored terminal) 40 is provided with a monitoring protocol controller 42 that executes a monitoring protocol with the monitoring server 3 via a LAN communicator 41, and a status information collector 43 transmits status information that is collected from each section of the receiver terminal 40, to the monitoring server 3. The status information collector 43 collects status information such as un-printable state at a printer (e.g., no paper, abnormal condition at a printer control circuit, no toner for a laser printer, or no ink for an inkjet printer), and un-receivable state for documents at an apparatus as a whole (e.g., full memory for saving received documents).

Further, the receiver terminal 40 is provided with a registration protocol controller 44, and transmits its own IP address, mail address, and destination information maintained in a memory by a destination information storage section 45, to the monitoring server 3 to be registered. Destination information includes an address book and one-touch button/speed dial number registration table, which are referred to when designating an e-mail message destination at the receiver terminal.

Figure 5:
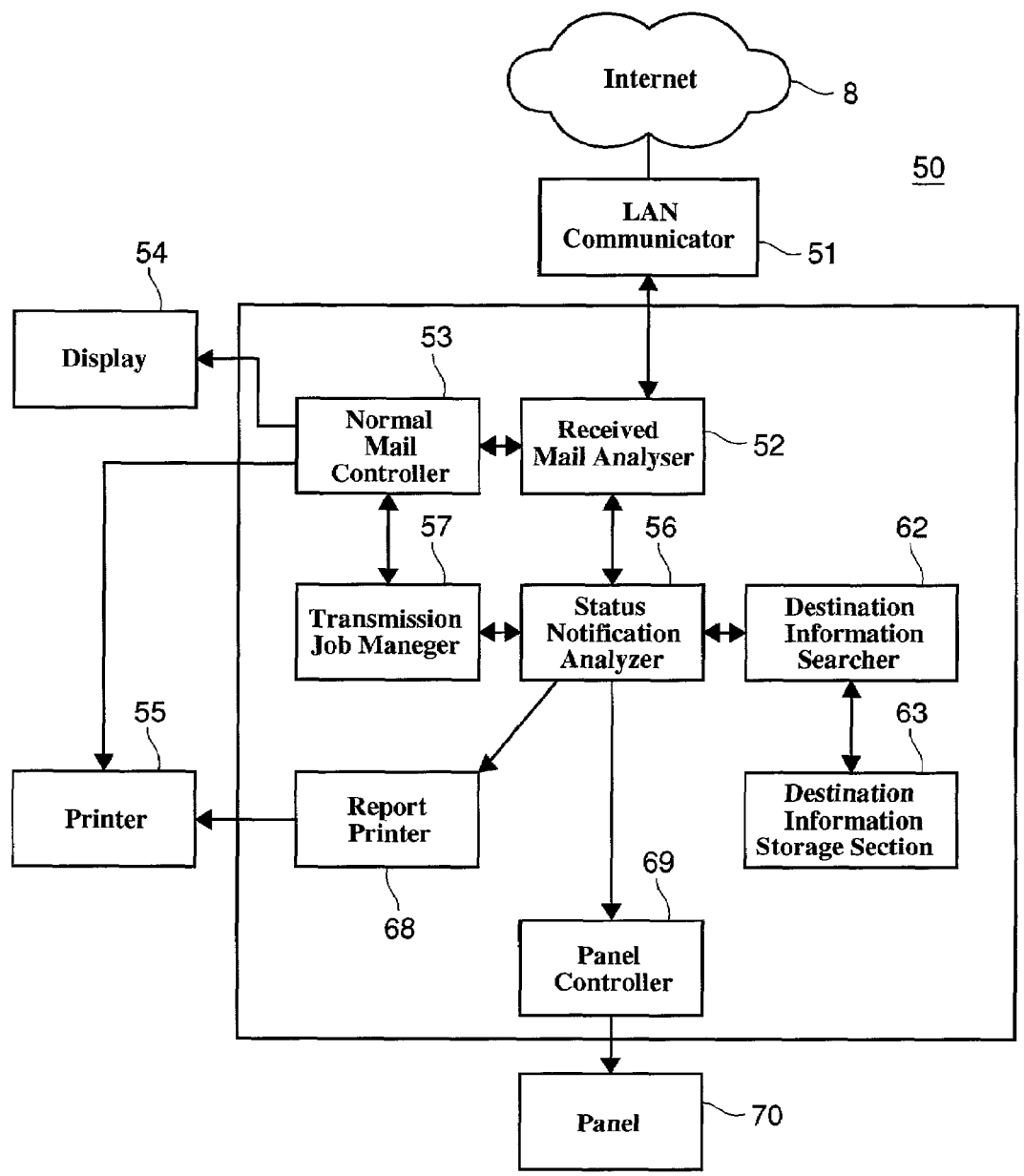
FIG. 5 is a block diagram illustrating functions of the sender terminal according to the embodiment of the present invention.

FIG. 5 is a block diagram illustrating functions of the sender terminal according to the embodiment of the present invention. A sender terminal (notified terminal) 50 accesses the mail server 11 through a LAN communicator 51, via the internet 8, and receives e-mail messages arrived at its mailbox.

A received mail analyzer 52 analyzes an e-mail message received at the LAN communicator 51, and determines whether the message is a status notification mail. When the received e-mail message is not a status notification mail, a normal mail controller 53 performs a predetermined post reception process of the e-mail message. The post reception message includes, for example, displaying the e-mail message on a display 54, and printing the message with a printer 55. The normal mail controller 53 also transmits e-mail messages via the LAN communicator 51.

A status notification analyzer 56 analyzes the status notification mail, recognizes the status of the receiver terminal 40, and performs processes to notify the users of the recognized status (e.g., by printing a report, sounding an alarm, and displaying on a panel).

A transmission job manager 57 manages a transmission job performed by the normal mail controller 53. FIG. 6 shows a transmission job managing table that is maintained by the sender terminal according to the embodiment of the present invention. The transmission job manager 57 registers a job number 59, transmission destination 60, and job status 61 for every transmission job, in a transmission job managing table 58. The job number 59 is a number assigned to each e-mail message in the order of reserved transmission job, to manage the transmission job. The transmission destination 60 is a FRITZ mail address of the e-mail message transmission destination. Further, a job status 61 shows a current status of the transmission job.

In FIG. 5, a destination information searcher 62 searches the one-touch button/speed dial number registration table maintained by a destination information storage section 63, and determines whether the receiver terminal, which has sent the status notification mail informing of the status, is registered in the one-touch button/speed dial number registration table. FIG. 7 shows the one-touch button/speed dial number registration table that is maintained by the sender terminal according to the embodiment of the present invention. The one-touch button/speed dial number registration table 64 has a destination address 66 and status information 67 registered for each register number 65. The register number 65 is a number that is assigned to each one-touch button or speed dial number. The destination address 66 is an e-mail address of the receiver terminal 40, which is designated when a one-touch button is pressed or when a speed dial number is input. The status information 67 shows a status of the receiver terminal 40, which is notified from the monitoring server 3. The status information 67 uses the following: 0 for normal; 1 for power turned off; 2 for printer cannot be used (un-printable); and 3 for document un-receivable.

In FIG. 5, a report printer 68 creates a warning report that includes the status of the receiver terminal 40, which is recognized by the status notification analyzer 56, and prints the report with the printer 55.

Figure 8:
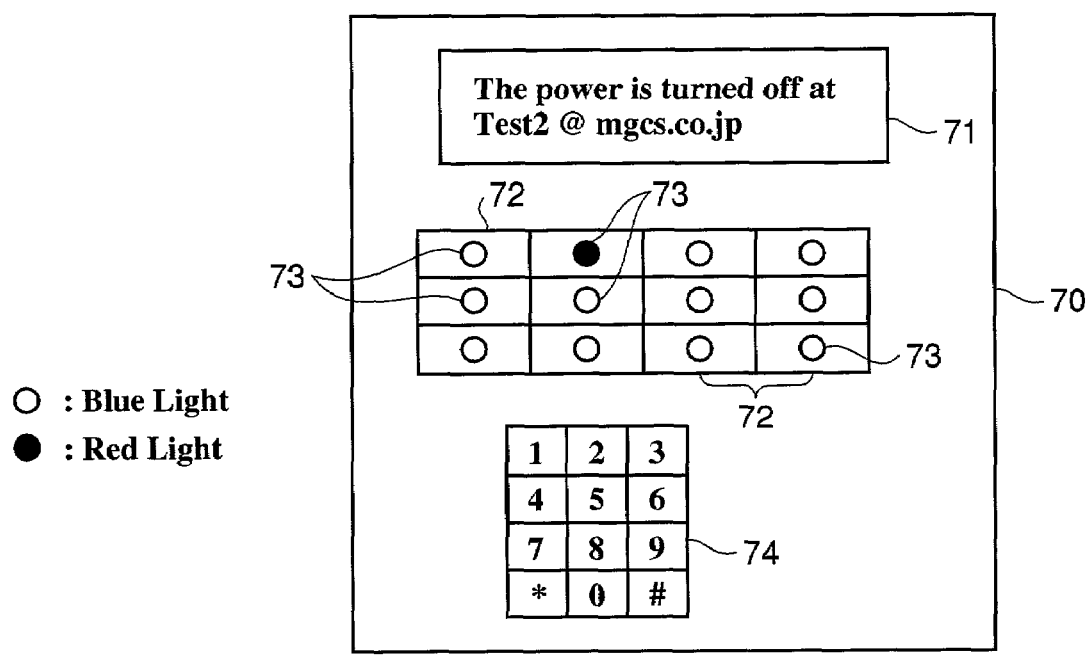
FIG. 8 is a plan view of a panel of the sender terminal according to the embodiment of the present invention.

A panel controller 69 controls a panel 70. FIG. 8 is a plan view of a panel of the sender terminal according to the embodiment of the present invention. The panel 70 is provided with a LCD 71, multiple one-touch buttons 72, and numeric keys 74. The one-touch buttons 72 are provided with LED 73 that illuminates two colors (e.g., blue and red).

The panel controller 69, according to status of the receiver terminal 40 recognized by the status notification analyzer 56, displays messages to show the status on the LCD 71 of the panel 70 and switches illuminated colors of the LED 73 provided in the one-touch buttons 72 of the panel 70 (e.g., from blue to red).

A typical example of the sender terminal 50 and the receiver terminal 40 with the above-described structure is an IFAX. Therefore, IFAX units that are used for the sender terminal 50 and the receiver terminal 40 are explained in the following.

Figure 9:
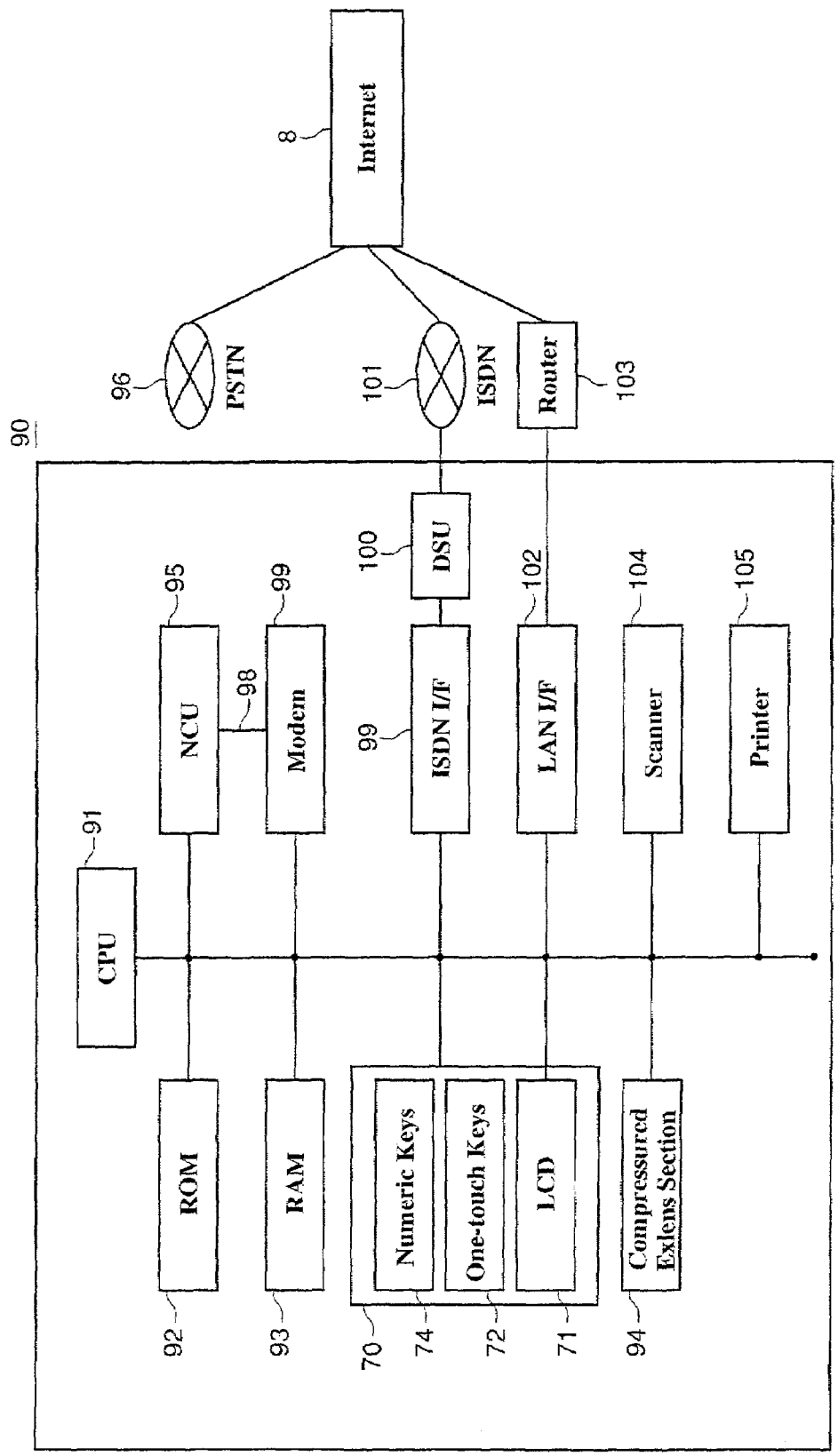
FIG. 9 is a block diagram illustrating hardware of internet facsimile terminal apparatus as sender and receiver terminals, according to the embodiment of the present invention.

FIG. 9 is a block diagram illustrating hardware of internet facsimile terminal apparatus as sender and receiver terminals, according to the embodiment of the present invention. In an IFAX terminal apparatus 90, a CPU 91 executes a program and controls the entire apparatus. A ROM 92 stores a program that is executed by the CPU 91.

A RAM 93 is provided with a work area that executes programs, and a buffer area that temporarily stores various data such as e-mail and image files.

A compression/extension section 94 compresses transmitting image information into facsimile data such as MH, MR, and MMR, and extends receiving facsimile data into image information.

A network control unit (NCU) 95 is connected to a PSTN 96. A modem 97 is connected to the network control unit 95 via an analog signal line 98. The modem 97 modulates/demodulates facsimile data that is transmitted to or received from the other facsimile apparatus, via a PSTN 96. Also, an ISDN interface (I/F) 99 is connected to an ISDN 101, via a digital service unit (DSU) 100.

A LAN interface 102 is connected to the internet 8, via a router 103, and executes steps necessary for transmitting/receiving data via the internet 8.

A scanner 104 scans documents and obtains image information. A printer 105 prints various data including received image information.

A panel 70 is provided with the LCD 71, one-touch buttons 72, and numeric keys 74, as shown in FIG. 8, as described above, and is input operations from operators, such as input of phone numbers (FAX numbers), e-mail addresses, user IDs, and passwords, and instruction of initiating transmission. The panel 70 is also provided with the LCD 71, which displays various information of facsimile and IFAX units such as input results, apparatus operation status and transmission results.

Figure 10:
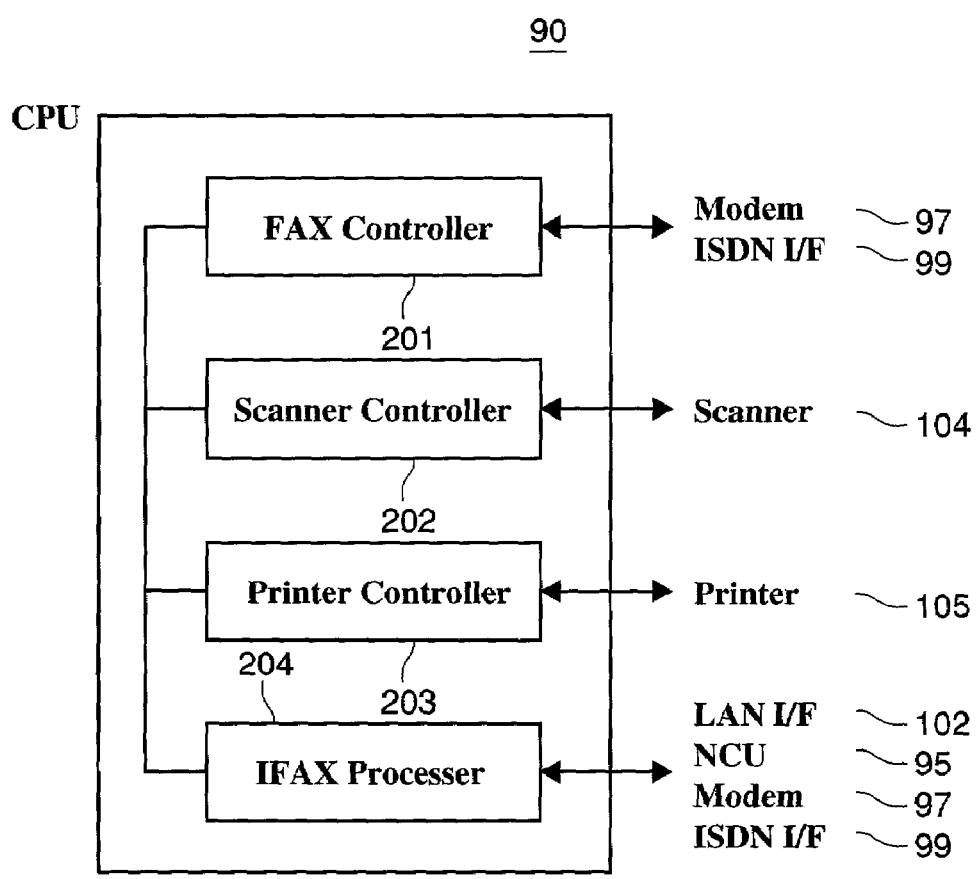
FIG. 10 is a block diagram illustrating functions of the internet facsimile terminal apparatus according to the embodiment of the present invention.

FIG. 10 is a block diagram illustrating functions of the internet facsimile terminal apparatus according to the embodiment of the present invention. The IFAX terminal apparatus 90 is provided with a FAX controller 201, scanner controller 202 and printer controller 203, and controls processing sections: the modem 97; ISDN interface 99; scanner 104; and printer 105.

Also, the IFAX terminal apparatus 90 is provided with an IFAX processor 204 that allows the terminal to function as an IFAX. The IFAX processor 204 is connected to the internet 8 using the LAN interface 102 via the router 103, and transmits/receives e-mail. The IFAX processor 204 is also connected to the internet 8 via dial-up, using the modem 97 or the ISDN interface 99, and transmits/receives e-mail.

The functions of the IFAX processor 204 are briefly explained. When transmitting e-mail, the IFAX processor 204 scans image information by the scanner 104, compresses it by the image compression/extension section 94, and converts the same into a TIFF-FX file. The TIFF-FX file format is a standard data format for internet facsimiles and is defined in RFC 2301 of the IETF (Internet Engineering Task Force). Next, the IFAX processor 204 generates an e-mail message in a multi-part format, with the TIFF-FX file attached. The e-mail message in the multi-part format adheres to the MIME (Multipurpose Internet Mail Extension). The TIFF-FX file is coded into a text, by the Base 64, for example, and is incorporated into an attached file part of the e-mail message. Further, the IFAX processor 204 transmits the generated e-mail message to the mail server (SMTP server) 11, according to the SMTP.

When receiving e-mail, on the other hand, the IFAX processor 204 receives an e-mail message from its own mailbox, according to the POP3 protocol with the mail server (POP3 server) 11. Next, the IFAX processor 204 decodes the text code of the attached file part of the received e-mail message by the Base 64, and obtains a TIFF-FX file. Further, the IFAX processor 204 opens the TIFF-FX file. An image extension section 604 extends the compressed file contained in the TIFF-FX file, and obtains fresh image information. With the above process, e-mail is converted into an image information format. Such image information is input in the printer 105 via the printer controller 203, to be printed.

In the computer network system 1 with the above-described structure, operations of the monitoring server 3 that monitors the receiver terminal 40 and notifies the sender terminal 50 with the status are explained.

Figure 11:
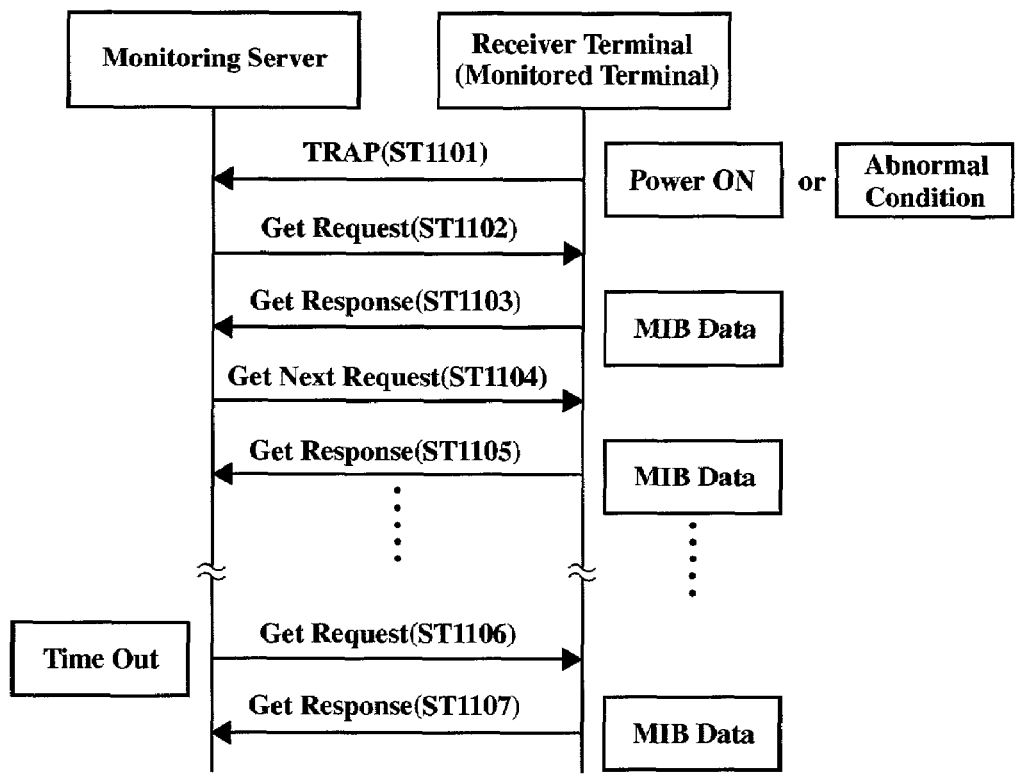
FIG. 11 is a sequence chart illustrating a monitoring protocol executed between the monitoring server and the receiver terminal according to the embodiment of the present invention.
Figure 12:
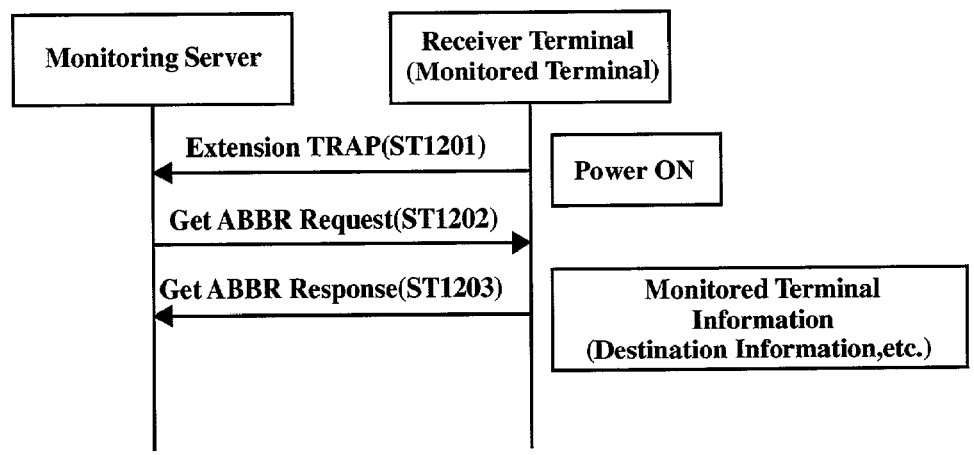
FIG. 12 is a sequence chart illustrating a registration protocol executed between the monitoring server and the receiver terminal according to the embodiment of the present invention.

First, monitoring of the receiver terminal 40 is explained. FIG. 11 is a sequence chart illustrating a monitoring protocol executed between the monitoring server and the receiver terminal according to the embodiment of the present invention. FIG. 12 is a sequence chart illustrating a registration protocol executed between the monitoring server and the receiver terminal according to the embodiment of the present invention.

In the present embodiment, the SNMP (Simple Network Management Protocol) is used for the communication between the monitoring server 3 and the receiver terminal (monitored terminal) 40. The SNMP is a real-time type protocol to monitor and manage units that are connected to the TCP/IP network via the network. Generally, the SNMP is used as a standard protocol to send the network management information of the network units (agents), such as hubs, to the managing system (manager). The network management information includes a standardized structure, and it is called MIB (Management Information Base). In the MIB, information is registered according to the network units and protocols. In the present embodiment, the receiver terminal 40 notifies the monitoring server 3 of its own status, by including the status information of the receiver terminal 40 in the logic structure of the MIB (SMI: structure of Management Information).

Specifically, as shown in FIG. 11, the receiver terminal 40 transmits a TRAP message to the monitoring server 3, when the terminal is turned on (ST1101). The TRAP message packet includes data to show that the receiver terminal 40 is a terminal that can be monitored by the monitoring server 3, in other words, data to show that the monitoring server 3 monitors the status information and notifies the sender terminal 50 (monitored terminal identification data). In addition to the receiver terminal 40, there are network units that transmit the TRAP message packet that notifies the LAN 2, when they are turned on. According to the existence of the monitored terminal identification data inside of the TRAP message packet, whether the sender of the TRAP message is a monitored terminal can be determined. TRAP messages including additional data, such as the monitored terminal identification data, is called extension TRAP messages in this embodiment. The receiver terminal 40, when it is turned on, actually transmits both the TRAP message to notify that the power is turned on, and the extension TRAP message that includes the monitored terminal identification data.

The monitoring server 3, upon receiving the extension TRAP message, transmits a "Get Request" message to the receiver terminal 40, which sent the TRAP message (ST1102). The receiver terminal 40 composes MIB data including status information, and replies with the MIB data together with a "Get Response" message, to the monitoring server 3 (ST1103). The monitoring server 3, in order to obtain the next MIB data, transmits a "Get Next Request" message to the receiver terminal 40 (ST1104). The receiver terminal 40, upon receiving the "Get Next Request" message, transmits the next status information to the monitoring server 3 (ST1105). The monitoring server 3 continues to transmit "Get Next Request" messages until all the status information is obtained from the receiver terminal 40.

Further, the receiver terminal 40 transmits a TRAP message even in an abnormal condition, so that, by performing Steps 1102-1105, the monitoring server 3 can be notified of the status information during the abnormal condition.

Also, after an expiration of a predetermined time interval (time-out) without receiving a TRAP message from the receiver terminal 40, the monitoring server 3 transmits a "Get Request" message to the receiver terminal 40 (ST1106), and the receiver terminal 40 replies with MIB data, together with a "Get Response" message (ST1107). The above monitoring protocol is executed by the monitoring server 3, and the monitoring protocol controllers 22 and 42 in the receiver terminal 40. Also, the extension TRAP becomes a trigger to transmit a "Get ABBR Request" message, and is issued to change the content of the registration of the monitoring cards, when the power is on, or speed dial number registration is changed. Normally, by sending a TRAP, a sequence for sending/receiving "Get Request" and "Get Response" messages (i.e., standard SNMP) is executed.

Additionally, as shown in FIG. 12, upon receiving an extension TRAP message from the receiver terminal 40 when the power is turned on (ST1201), the monitoring server 3 transmits a monitored terminal information request message (Get ABBR Request message), which requests to transmit monitored terminal information, to the receiver terminal 40 (ST1202). The "Get ABBR Request" message is an independent extension of the SNMP. Upon receiving the "Get ABBR Request" message, the receiver terminal 40 transmits the monitored terminal information together with a "Get ABBR Response" message, to the monitoring servers (ST1203). The receiver terminal 40 transmits destination information that is maintained by the destination information storage section 45 in FIG. 4. Or more specifically, the destination address 66 that is registered in the one-touch button/speed dial number registration table 64 in FIG. 7, as monitored terminal information, to the monitoring server 3.

Figure 13:
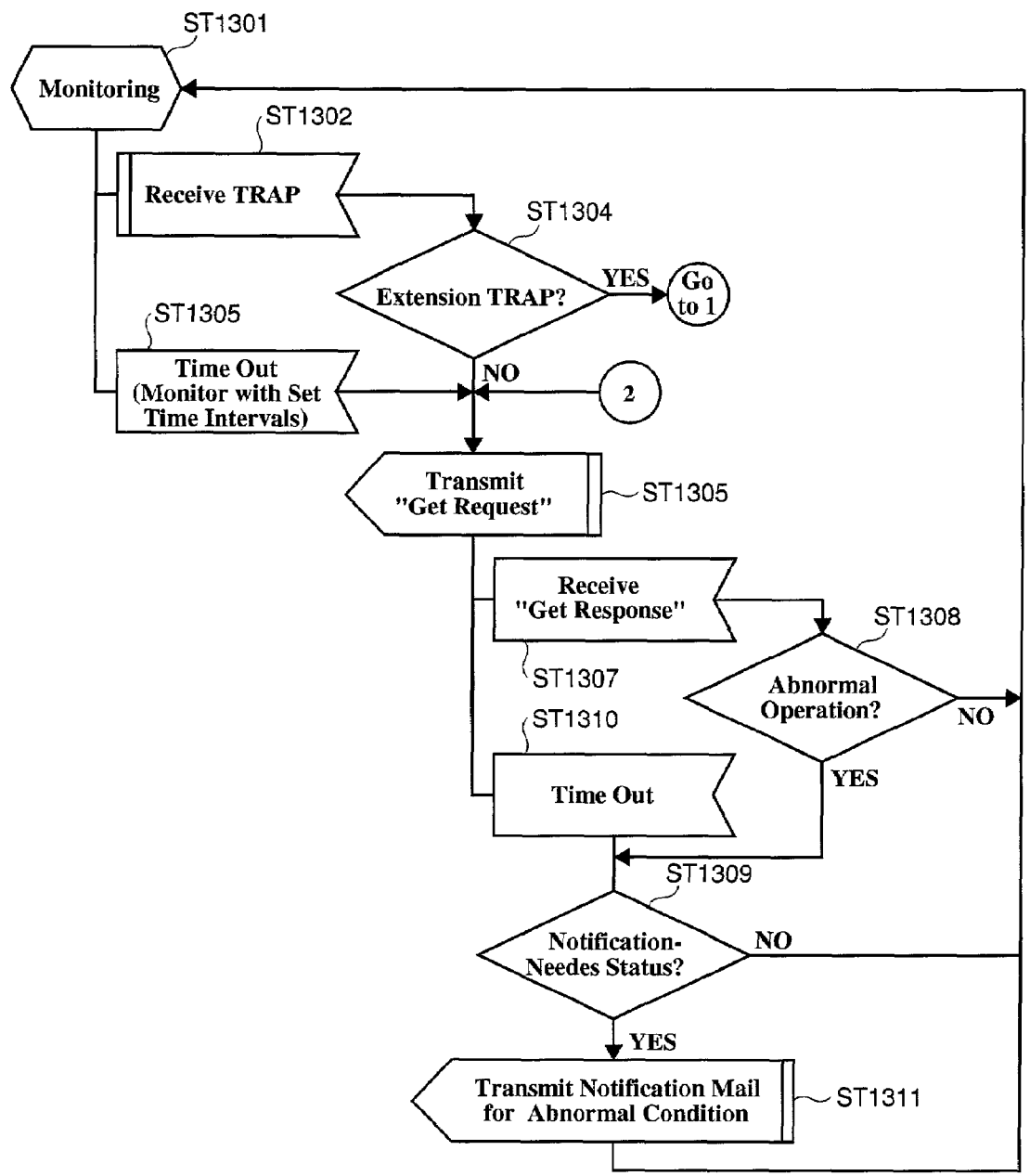
FIG. 13 is a flowchart illustrating an operation of the monitoring server according to the embodiment of the present invention.
Figure 14:
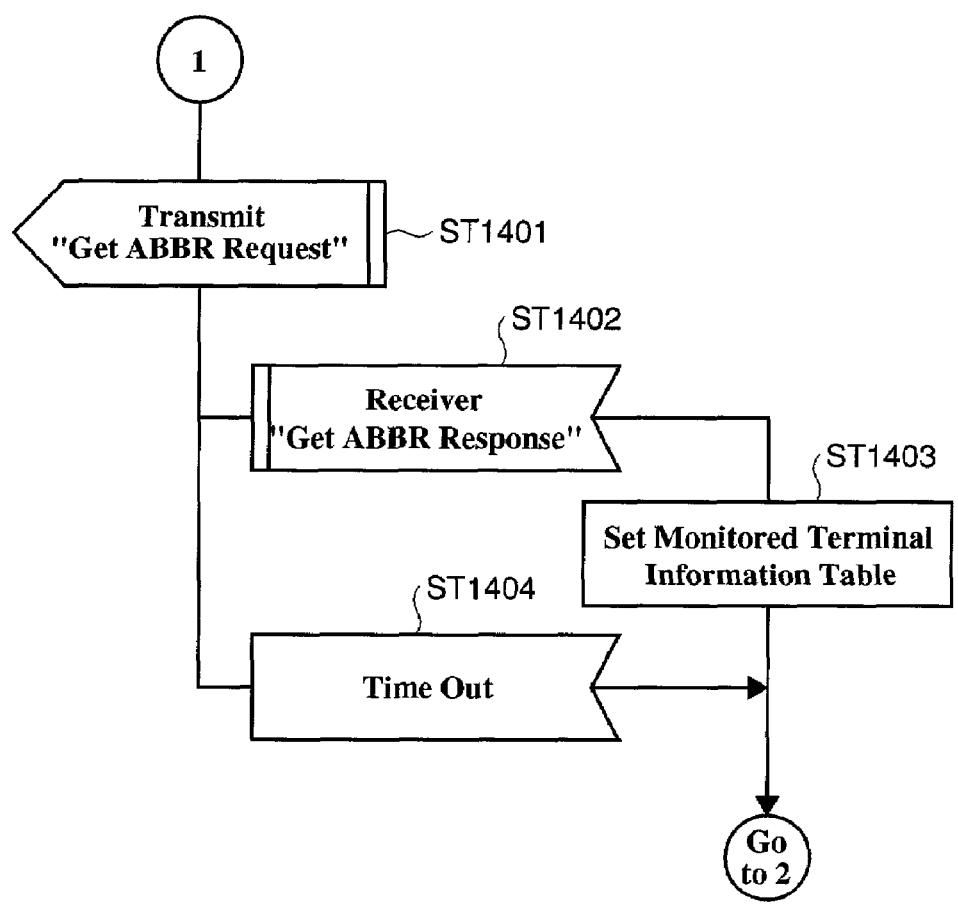
FIG. 14 is a flowchart illustrating an operation of the monitoring server according to the embodiment of the present invention.

Next, operations of the monitoring server 3 and the receiver terminal 40 are explained. FIGS. 13 and 14 are flowcharts illustrating operations of the monitoring server according to the embodiment of the present invention. Also, FIG. 15 is a flowchart illustrating an operation of the receiver terminal according to the embodiment of the present invention.

Figure 15:
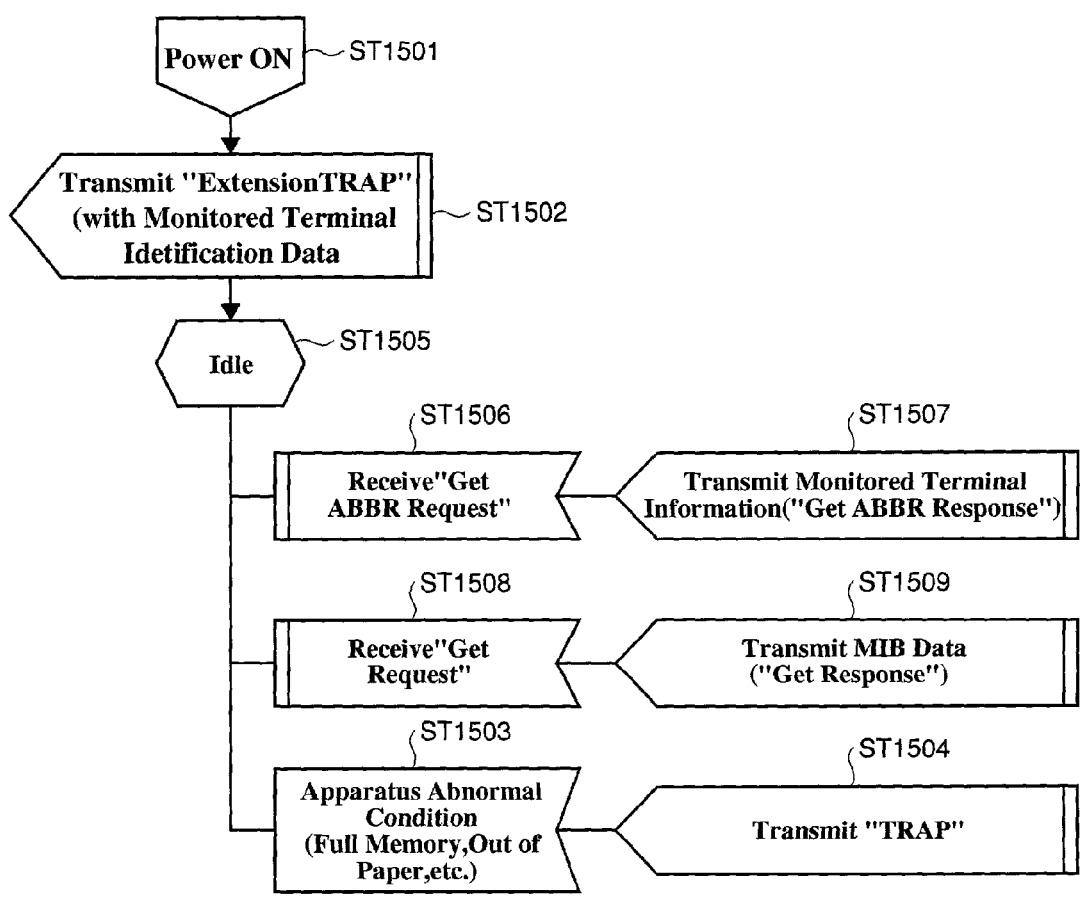
FIG. 15 is a flowchart illustrating an operation of the receiver terminal according to the embodiment of the present invention.

The receiver terminal 40, when the power is turned on, as shown in FIG. 15 (ST1501), transmits an extension TRAP message including the monitored terminal identification data to the monitoring server 3 (ST1502). Also, the receiver terminal 40, when having an abnormal condition, such as fall memory or no paper (ST1503), transmits a TRAP message (ST1504).

As shown in FIG. 13, upon receiving a TRAP message during the monitoring operation of ST1301 (ST1302), the monitoring server 3 checks whether the TRAP message is an extension TRAP message (ST1304).

If the answer is "YES", the monitoring server 3 at ST1401 of FIG. 14, transmits a "Get ABBR Request" message to the sender terminal 50. In response, the receiver terminal 40, upon receiving the "Get ABBR Request" message when idling (ST1505), as shown in FIG. 15 (ST1506), replies with a "Get ABBR Response" message together with the monitored terminal information (ST1507). In FIG. 14, when the monitoring server 3 receives the "Get ABBR Response" message (ST1402), the monitored terminal information storage section 25 registers the monitored terminal information in the monitored terminal information table 30 (ST1403), and the control returns to ST1305 of FIG. 13. However, if the "Get ABBR Response" message is not returned even after an expiration of a predetermined time interval (ST1404), the control returns to ST1305 without registration.

At ST1304 of FIG. 13, if the terminal registration is not necessary, and after an expiration of a predetermined time interval from the previous time (ST1306), the monitoring server 3 transmits a "Get Request" message to the receiver terminal 40 (ST1305).

As shown in FIG. 15, upon receiving the "Get Request" message (ST1508), the receiver terminal 40 composes MIB data including its own status information, and replies with the MIB data together with a "Get Response" message (ST1509).

In FIG. 13, when the monitoring server 3 receives the "Get Response" message (ST1307), the monitoring controller 26 checks whether there is an abnormal condition (ST1308). This is done by analyzing and determining the content of the MIB data. If there is no abnormal condition, the control returns to ST1301 and continues monitoring. However, when there is an abnormal condition, the control proceeds to ST1309. Further, at ST1305, when a predetermined time passes after transmitting a "Get Request" message (ST1310), the monitoring server 3 also determines that the receiver terminal 40 may have been turned off and cannot return a "Get Response" message". Thus, the control goes to ST1309; similar to an abnormal condition.

At ST1309, the monitoring controller 26 of the monitoring server 3 checks whether the abnormal condition of the receiver terminal 40 needs to be notified, based on the notification-needed status 35, at the monitored terminal information table 30.

If the notification is necessary ("YES"), the notification transmitter 23 generates abnormality notification mail (the status notification mail that notifies abnormal status), and notifies the sender terminal 50 (ST1311). Then the control returns to ST1301. If the notification is not necessary ("NO"), the control goes to ST1301 with no action.

As described above, the monitoring server 3 registers monitored terminal information of the receiver terminal 40, collects status information (abnormal condition information) of the receiver terminal 40, and notifies the sender terminal 50. Next, operation of the sender terminal 50 after receiving the abnormality notification mail from the monitoring server 5 is explained.

Figure 16:
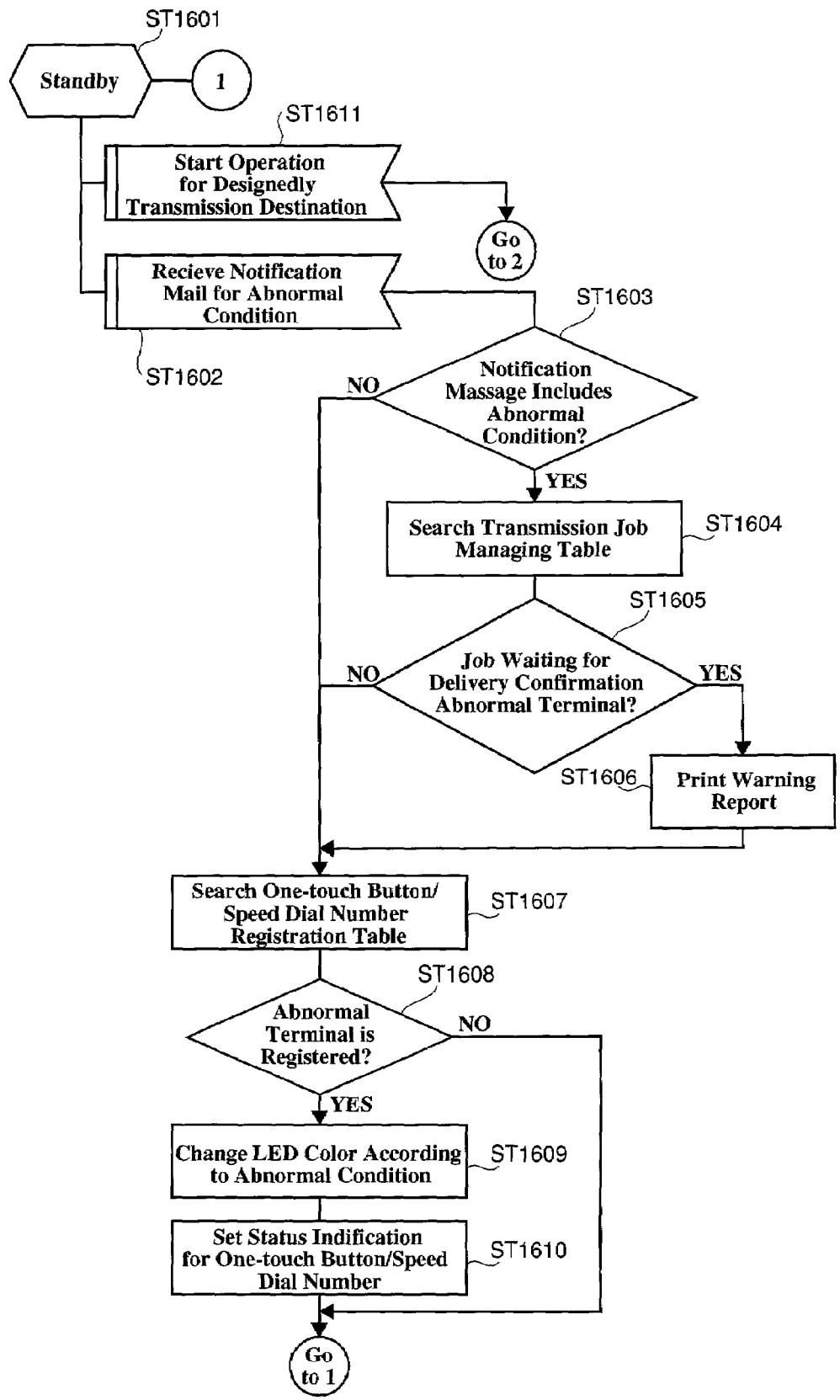
FIG. 16 is a flowchart illustrating an operation of the sender terminal upon receiving a notification from the monitoring server, according to the embodiment of the present invention.
Figure 17:
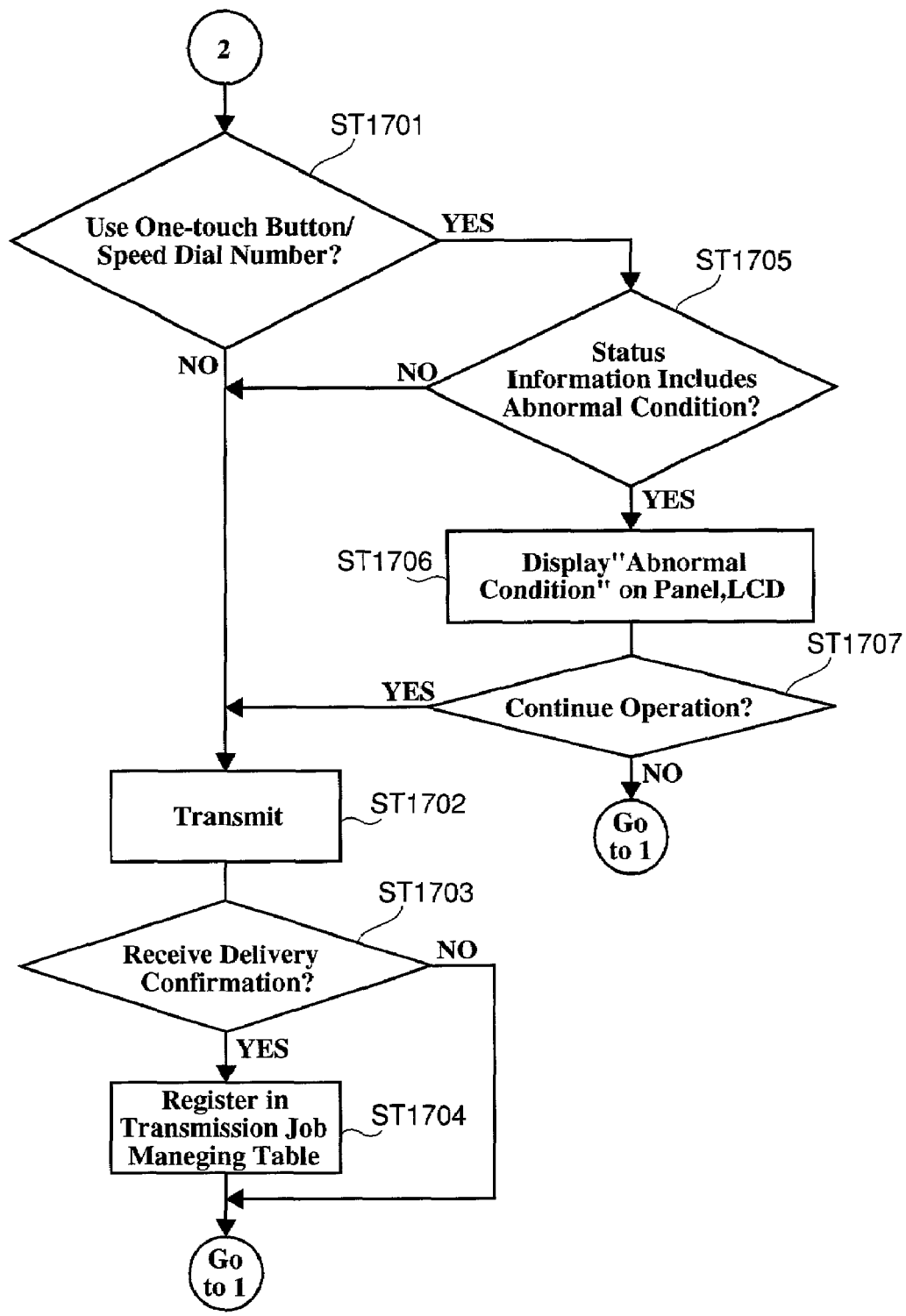
FIG. 17 is a flowchart illustrating an operation of the sender terminal upon receiving a notification from the monitoring server, according to the embodiment of the present invention.

FIGS. 16 and 17 are flowcharts illustrating an operation of the sender terminal upon receiving a notification from the monitoring server, according to the embodiment of the present invention. The sender terminal 50, during standby (ST1601), upon receiving the abnormality notification mail from the receiver terminal 40 (ST1602), checks whether the notification message includes abnormal condition (ST1603). If the answer is "YES", the sender terminal 50 searches the transmission job managing table 58 in FIG. 6 (ST1604), and checks whether there is a transmission job waiting for a delivery confirmation from the receiver terminal 40 (abnormal terminal) that sent the abnormality notification mail (ST1605). If the answer is "YES", a warning report 1801 as shown in FIG. 18, or the like, is printed (ST1606).

If the answer is "NO" at ST1603 and ST1605, and when the warning report has been printed at ST1606, the sender terminal 50 searches the one-touch button/speed dial number registration table 64 (ST1607), and checks whether the abnormal terminal is already registered (ST1608). If it is registered, the illuminated color of the LED 73 of the corresponding button at the one-touch buttons 72 is changed to indicate the abnormal condition (e.g., blue to red) (ST1609).

Then, according to the content of the notification, the status information 67 of the one-touch button/speed dial number registration table 64 is set (ST1610), and the control returns to standby (ST1601).

Further, the sender terminal 50, when an operation for designating a transmission destination is started during standby of ST1601 (ST11611), determines whether one of the one-touch buttons/speed dial numbers is used at ST1701 of FIG. 17. If the answer is "NO", the control proceeds to document transmission of ST1702. If the answer is "YES", whether the status information of the one-touch button/speed dial number registration table 64 indicates an abnormal condition is checked (ST1703). If there is no abnormal condition indicated, the control proceeds to document transmission of ST1702.

If there is an abnormal condition, a message to notify the abnormal condition is displayed on the LCD 71 of the panel 70 (ST1704), to ask the sender whether to continue the operation (ST1705). If the sender chooses to continue the operation, the document is transmitted (ST1702). If the sender chooses not to continue the operation, the control returns to ST1601 of FIG. 16.

After the document transmission is completed at ST1702, whether to receive a delivery confirmation is determined (ST1703). If the answer is "YES", the transmission job is registered on the transmission job managing table 58 (ST1704), and the control returns to ST1601.

As described above, according to the embodiment of the present invention, the monitoring server 3 monitors the receiver terminals 40, such as IFAX 4 and PC 5. If the receiver terminals 40 have any changes in the status, in other words, if the receiver terminals 40 have any abnormal conditions, status notification mail (abnormality notification mail) to notify the sender terminal 50 (IFAX units 6, 7, and 9) is transmitted. Upon receiving the status notification mail, the sender terminal 50 informs the sender about the notification message. Specifically, in this embodiment, at the sender terminal 50, by switching the illuminated color (e.g., blue to red) of the LED 73 set in each of the one-touch button 72, the sender is notified that receiver terminal 40 that corresponds to the one-touch button has an abnormal condition that does not allow message reception. The sender, when designating a transmission destination using one of the one-touch buttons 72, must look at the one-touch button 72. Therefore, the sender is actually notified of the abnormal condition of the receiver terminal 40, to which the sender is about to transmit a document, prior to performing a transmission operation. Also, by displaying a message on the LCD 71 and by printing a warning report 1801 by the printer 55, the sender is notified of an abnormal condition of the receiver terminal 40, prior to performing a transmission operation, that is, prior to inputting a transmission destination. Therefore, the sender can confirm the status of the receiver terminal 40, prior to transmission, and choose other means of document transmission, such as via a G3FAX. Consequently, it is possible to avoid unnecessary transmission and to save unnecessary time, compared to discovering that the sender terminal 40 cannot receive a message because of some abnormal condition, by a delivery confirmation mail after the actual transmission, and transmitting the document by other means.

The abnormal conditions of the receiver terminal 40 are monitored by using a communication protocol (such as SNMP), which is different from e-mail delivery protocols (such as SMTP and POP3). Further, abnormal conditions of the receiver terminal 40 is notified to the sender terminal 50, by a route (from the monitoring server 3 to the sender terminal 50) separate from the conventional error mail delivery route (from the mail server 11 to the sender terminal 50). Therefore, when a notification of the abnormal condition is delayed because of the delay in error mail delivery to notify that the transmitted message has not been received normally by the other side, and when the receiver terminal 40 has an abnormal condition during the delivery of the transmitted message, the sender terminal 50 is notified of the abnormal condition at the receiver terminal 40 by the monitoring server 3. The sender is also notified of the same, by a change in the illuminated color of the LED 73, message display on the LCD 71, and printout of a warning report. Therefore, it is possible to notify the sender of the abnormal condition in advance, even with the above circumstances, and to quickly take appropriate actions.

Additionally, when the power is on, the receiver terminal 40 notifies the monitoring server 3, and the monitoring server 3 transmits status notification mail to notify the sender terminal 50. Therefore, it is possible for the sender terminal 50 to recognize that the power is on at the receiver terminal 40. Also, the monitoring server 3 periodically requests the receiver terminal 40 for status notification (ST1305 and ST1306). When there is no reply from the receiver terminal 40 in response to the request (ST1301), the monitoring server 3 determines that the receiver terminal 40 is turned off, and transmits abnormality notification mail that notifies that the power is off, to the sender terminal 50. Therefore, the sender terminal 50 can notify the sender that the receiver terminal 40 is turned off, by the change of illuminated color of the LED 73 that indicates the abnormal conditions, for example. Thus, it is possible to notify the sender that the receiver terminal 40 is turned off, which is not possible with the delivery confirmation mail. It is also possible to avoid unnecessary transmission, thus to save unnecessary time.

The receiver terminal 40 notifies the monitoring server 3 of abnormal conditions such as unprintable state because of printing jam, no paper, etc., and un-receivable state because of the full reception memory. The monitoring server 3 then notifies the sender terminal 50, by abnormality notification mail. Therefore, the sender terminal 50, by changing the illuminated color of the LED 73 to indicate the abnormal condition, can notify the sender that the message cannot be delivered to the receiver, since the receiver terminal 40 cannot receive the message or cannot print the message. Consequently, it is possible to save time and avoid unnecessary transmission operation to the receiver terminal 40, which cannot deliver the message to the receiver immediately.

Also, in the embodiment of the present invention, as shown in FIGS. 14 and 15, the monitoring server 3 sends a monitored terminal information request message ("Get ABBR request" message) to the LAN 2 (ST1401), and the receiver terminal 40, which is a monitored terminal on the LAN 2, responds to the message (ST1506 and ST1507), to notify its own monitored terminal information. Therefore, the monitored terminal information is automatically collected and registered in the monitoring server 3.

Further, the receiver terminal 40 automatically extracts notifying mail address or the like, in the monitored terminal information, from the destination information stored in its own destination information storage section 63 (one-touch buttons/speed dial number registration table). Therefore, the monitoring server 3 can selectively notify the sender terminal 50, that often transmits message to the receiver terminal 40. Consequently, the monitoring server 3 can effectively operate notification of abnormal condition in terms of time and number of processing steps.

The present invention is not limited to the above described embodiments, and various variations and modifications may be possible without departing from the scope of the present invention.

This application is based on the Japanese Patent Application No. 2001-051671 filed on Feb. 27, 2001, entire content of which is expressly incorporated by reference herein.

What is claimed is:

1. A transmitting apparatus for sending an Internet facsimile that communicates with a receiving apparatus for receiving the Internet facsimile, the receiving apparatus exchanging data with a monitoring apparatus that monitors a status of the receiving apparatus, the transmitting apparatus comprising:
   a receiver configured to receive, from the monitoring apparatus, status information of the receiving apparatus, the monitoring apparatus being distinct from the receiving apparatus;
   a memory configured to store the status information of the receiving apparatus; and
   a controller configured to check the status information of the receiving apparatus stored in the memory of the transmitting apparatus without accessing the monitoring apparatus when destination information of the receiving apparatus is input for a transmission of transmitting data to the receiving apparatus, and to notify, a user of the transmitting apparatus, the status information of the receiving apparatus prior to the transmission of the transmitting data to the receiving apparatus,
   the controller being further configured to transmit the transmitting data to the receiving apparatus when the receiving apparatus is available, based on the status information of the receiving apparatus stored in the memory of the transmitting apparatus;
   wherein the status information of the receiving apparatus comprises an indication that the receiving apparatus for receiving the Internet facsimile is unable to print the transmitting data.

2. The transmitting apparatus for transmitting the Internet facsimile according to claim 1, wherein the status information of the receiving apparatus for receiving the Internet facsimile comprises one of power being turned ON and power being turned OFF.

3. The transmitting apparatus for sending the Internet facsimile according to claim 1, wherein the status information of the receiving apparatus comprises an indication that the receiving apparatus is unable to receive the transmitting data.

4. The transmitting apparatus for sending the Internet facsimile according to claim 1, wherein the transmitting apparatus comprises an Internet facsimile apparatus.

5. A monitoring apparatus, comprising:
   a communicator configured to communicate data with a receiving apparatus for receiving an Internet facsimile to receive status information of the receiving apparatus, the receiving apparatus storing destination information of a predetermined transmitting apparatus for sending an Internet facsimile, and to receive, from the receiving apparatus, the destination information of the transmitting apparatus; and
   a controller configured to transmit, to the predetermined transmitting apparatus, the status information of the receiving apparatus, based on the received destination information of the predetermined transmitting apparatus, whereby the predetermined transmitting apparatus notifies a user of the predetermined transmitting apparatus, the status information of the receiving apparatus prior to a transmission of transmitting data to the receiving apparatus without accessing the monitoring apparatus, the predetermined transmitting apparatus transmitting the transmitting data to the receiving apparatus when the receiving apparatus is available, based on the status information of the receiving apparatus stored in a memory of the transmitting apparatus, the monitoring apparatus being distinct from the receiving apparatus;
   wherein the status information of the receiving apparatus for receiving the Internet facsimile comprises an indication that the receiving apparatus is unable to print the transmitting data.

6. The monitoring apparatus according to claim 5, wherein, when the receiving apparatus for receiving the Internet facsimile is turned ON, the commumcator receives the status information of the connected receiving apparatus, using a TRAP message.

7. The monitoring apparatus according to claim 5, wherein the transmitting apparatus for sending the Internet facsimile comprises an Internet facsimile apparatus, and the receiving apparatus for receiving the Internet facsimile comprises an Internet facsimile apparatus.

8. A receiving apparatus for receiving an Internet facsimile, comprising;
   a communicator configured to exchange data with a monitoring apparatus that monitors a status of the receiving apparatus, the monitoring apparatus being distinct from the receiving apparatus;
   a memory configured to store destination information of a predetermined transmitting apparatus for sending the Internet facsimile; and
   a controller configured to transmit, to the monitoring apparatus, an address of the transmitting apparatus, to collect status information within the receiving apparatus, and to transmit, to the monitoring apparatus, the collected status information of the receiving apparatus, whereby the monitoring apparatus transmits, to the predetermined transmitting apparatus, the status information of the receiving apparatus, based on the destination information of the predetermined transmitting apparatus, and the predetermined transmitting apparatus notifies a user of the predetermined transmitting apparatus, the status information of the receiving apparatus prior to a transmission of transmitting data to the receiving apparatus without accessing the monitoring apparatus;

wherein the status information of the receiving apparatus for receiving the Internet facsimile comprises an indication that the receiving apparatus is unable to print the transmitting data.

9. The receiving apparatus for receiving the Internet facsimile according to claim 8, wherein the controller transmits, to the monitoring apparatus, the status information of the receiving Internet facsimile apparatus using a TRAP message.

10. The receiving apparatus for receiving the Internet facsimile according to claim 8, wherein the receiving apparatus comprises an Internet facsimile apparatus.

11. A method for transmitting data using a transmitting apparatus for sending an Internet facsimile, the transmitting apparatus communicating with a receiving apparatus for receiving the Internet facsimile, the receiving apparatus exchanging data with a monitoring apparatus that monitors a status of the receiving apparatus, the method comprising:

receiving, from the monitoring apparatus, status information of the receiving apparatus, the monitoring apparatus being distinct from the receiving apparatus;

storing the status information of the receiving apparatus in a memory of the transmitting apparatus;

examining the status information of the receiving apparatus in the memory of the transmitting apparatus without accessing the monitoring apparatus;

notifying a user of the transmitting apparatus, the status information of the receiving apparatus prior to transmitting the transmitting data to a selected receiving apparatus; and transmitting the data to the receiving apparatus when the receiving apparatus is available, based on the status information of the receiving apparatus stored in the memory of the transmitting apparatus;

wherein the status information of the receiving apparatus for receiving the Internet facsimile comprises an indication that the receiving apparatus is unable to print the transmitting data.

12. A method for monitoring a receiving apparatus for receiving an Internet facsimile, using a monitoring apparatus, the monitoring apparatus exchanging data with the receiving apparatus, the method comprising:

receiving, from the receiving apparatus, status information of the receiving apparatus, the receiving apparatus storing destination information of a predetermined transmitting apparatus for sending the Internet facsimile;

receiving, from the receiving apparatus, the destination information of the transmitting apparatus;

storing the destination information of the predetermined transmitting apparatus; and transmitting, to the predetermined transmitting apparatus, the status information of the receiving apparatus, based on the stored destination information of the predetermined transmitting apparatus, whereby the predetermined transmitting apparatus notifies a user of the predetermined transmitting apparatus, the status information of the receiving apparatus prior to a transmission of transmitting data to the receiving apparatus without accessing the monitoring apparatus, the predetermined transmitting apparatus transmitting the transmitting data to the receiving apparatus when the receiving apparatus is available, based on the status information of the receiving apparatus stored in a memory of the transmitting apparatus, the monitoring apparatus being distinct from the receiving apparatus;

wherein the status information of the receiving apparatus for receiving the Internet facsimile comprises an indication that the receiving apparatus is unable to print the transmitting data.

13. A method for controlling a receiving apparatus for receiving an Internet facsimile, the receiving apparatus exchanging data with a monitoring apparatus, the method comprising;

storing destination information of a predetermined transmitting apparatus for sending an Internet facsimile;

transmitting, to the monitoring apparatus, the destination information of the transmitting apparatus;

collecting status information within the receiving apparatus; and transmitting, to the monitoring apparatus, the status information of the receiving apparatus, whereby the monitoring apparatus transmits, to the predetermined transmitting apparatus, the status information of the receiving apparatus, based on the destination information of the predetermined transmitting apparatus, and the predetermined transmitting apparatus notifies a user of the predetermined transmitting apparatus, the status information of the receiving apparatus prior to a transmission of transmitting data to the receiving apparatus without accessing the monitoring apparatus, the monitoring apparatus being distinct from the receiving apparatus;

wherein the status information of the receiving apparatus for receiving the Internet facsimile comprises an indication that the receiving apparatus is unable to print the transmitting data.

* * * * *